July 22, 1924.    A. SERAFINI    1,502,488
ANTISKID DEVICE FOR VEHICLE WHEELS
Filed Aug. 30, 1923
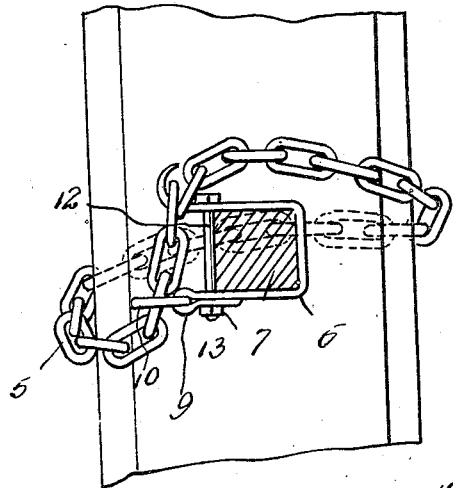
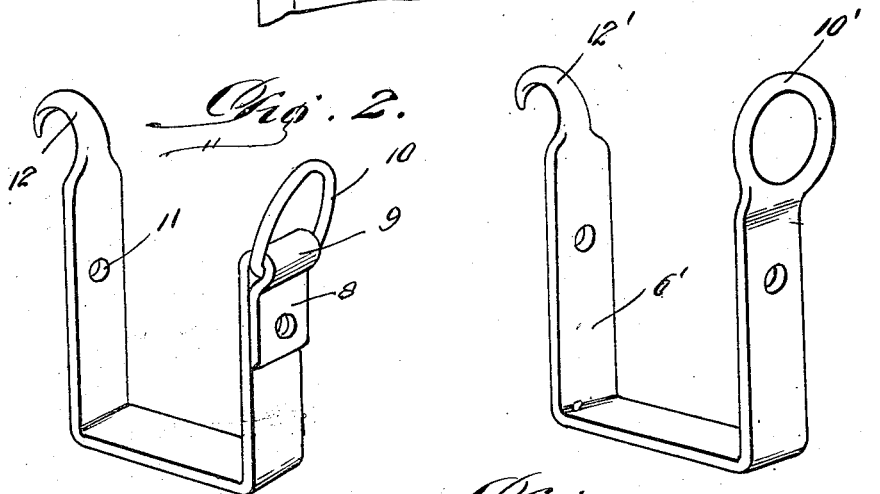
Angelo Serafini, Inventor Patented July 22, 1924.

1,502,488

UNITED STATES PATENT OFFICE.

ANGELO SERAFINI, OF ERIE, PENNSYLVANIA.

ANTISKID DEVICE FOR VEHICLE WHEELS.

Application filed August 30, 1923. Serial No. 660,088.

*To all whom it may concern:*

Be it known that I, ANGELO SERAFINI, a citizen of the United States, residing at Erie, in the county of Erie and State of Pennsylvania, have invented certain new and useful Improvements in Antiskid Devices for Vehicle Wheels, of which the following is a specification.

In carrying out the present invention it is my purpose to provide an anti-skid device for vehicle wheels wherein the anti-skid devices now upon the market are substantially improved and simplified.

The primary object of my invention resides in the provision of such an anti-skid device that includes a plurality of short chain sections adapted for engaging over the tires at different points thereon and adapted to be secured at their opposite ends to novel clamp elements carried by desirable ones of the wheel spokes.

A further object of my invention resides in the provision of such an anti-skid device wherein the chain elements included in this anti-skid device may be attached to or removed from the wheels in a novel, simple and expeditious manner and wherein when the same are applied the liability of them becoming disengaged from the wheels is substantially reduced.

With the above and other objects in view as the nature of the invention is better understood, the same comprises the novel form, combination and arrangement of parts set forth in the following specification, shown in the accompanying drawing and claimed.

In the drawing:

Figure 1 is a fragmentary section through a certain portion of a vehicle wheel showing one of the chain elements of my antiskid device positioned thereon, Figure 2 is a perspective view of the preferred embodiment of one of the clamp elements serving as a means for securing one of the chain sections to the wheel, and Figure 3 is a similar view of a slightly modified form of clamp element.

First having reference to Figures 1 and 2, my novel anti-skid device comprises a desirable number of chain sections 5, only one of which is shown. In actual practice, this chain section is engaged around the tire upon the wheel and is secured at its opposite ends to a clamp that is designated generally at 6 which is carried by the spoke 7 of the wheel.

The preferred embodiment of this clamp constitutes a single length of flat-like steel bent into U-shape as shown in Figure 2 one end thereof being reversely bent at 8 for providing a transverse eye portion 9 through which extends a link 10. The opposite leg of this clamp element 6 is reduced at its free end and bent outwardly to provide a hook 12.

In alinement with each other are openings 11 through opposite legs of the clamp whereby a bolt 12 may be positioned therethrough after the clamp has been arranged upon the spoke as shown in Figure 1, it being obvious that this bolt is screw-threaded at one end and headed at its opposite end, the screw-threaded end thereof adapted for the reception of a nut 13 whereby the clamp is maintained in positive engagement with the spoke.

In actual practice, one end link of the chain section 5 is passed over the hook 12 and the chain section then extended around the tire as shown in dotted lines in Figure 1, the chain section being then extended through the before mentioned link 10 that is carried by the clamp 6 and the opposite end link of the chain section hooked over the hook element 12 that is formed upon the before mentioned leg of said clamp 6.

In view of the foregoing it will be obvious that when this chain section has been positioned upon the wheel in the manner shown and described there will be little if any liability of the same becoming disengaged from the wheel and in view of a construction of this character it will be obvious that in order to apply these chain sections it is not necessary to jack the vehicle up as is now the case with practically all anti-skid chains upon the market.

In Figure 3 wherein there is shown a slightly modified form of clamp element designated 6' the leg of the clamp opposite from that formed with the hook 12', is so formed as to provide an integral loop portion 10' that will answer all of the purposes of the before mentioned link 10 of the clamp element 6 above described.

Minor changes may be made within the invention without departing from the spirit and scope of the appended claims.

Having thus described my invention, what I claim as new and desire to secure by Letters Patent is:—

1. In an anti-skid device for vehicle wheels, a clamp element adapted to be secured to one of the spokes of the wheel and including a link element and a hook element, a chain section having one of its end links engaged over said hook element said chain section adapted to engage around the wheel and adapted to have its opposite end passed through said link element and to have its opposite end link also engaged over the hook element of said clamp.

2. In an anti-skid device for vehicle wheels, a clamp embodying a U-shaped member formed at one end with a hook element and carrying at its oposite end a link element, means for securing said clamp upon the spoke of the wheel, and a chain section adapted to have one of its end link engaged over the hook element of said clamp, said chain section adapted to be engaged around the wheel and to have its opposite end link passed through the link element of said clamp and to be then engaged over the hook element of said clamp.

In testimony whereof I affix my signature.

ANGELO SERAFINI.